(12) United States Patent
Klein

(10) Patent No.: US 9,815,345 B2
(45) Date of Patent: *Nov. 14, 2017

(54) TRANSFORMATION METHOD OF HYBRID TRANSPORTATION VEHICLE FOR GROUND AND AIR, AND HYBRID TRANSPORTATION VEHICLE ITSELF

(71) Applicant: AeroMobil, S.R.O., Bratislava (SK)

(72) Inventor: Stefan Klein, Nitra (SK)

(73) Assignee: AEROMOBIL, S.R.O., Bratislava (SK)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,121

(22) Filed: Dec. 14, 2016

(65) Prior Publication Data

US 2017/0297395 A1    Oct. 19, 2017

Related U.S. Application Data

(63) Continuation of application No. 14/241,239, filed as application No. PCT/SK2012/000010 on Aug. 22, 2012, now Pat. No. 9,555,681.

(30) Foreign Application Priority Data

Aug. 30, 2011  (SK) ................................. 5039-2011
Aug. 30, 2011  (SK) ............................... 5044-2011 U

(51) Int. Cl.
*B60F 5/02*     (2006.01)
*B64C 3/56*     (2006.01)
(Continued)

(52) U.S. Cl.
CPC ............... *B60F 5/02* (2013.01); *B60F 5/003* (2013.01); *B64C 3/385* (2013.01); *B64C 3/54* (2013.01)

(58) Field of Classification Search
CPC ....................................................... B60F 5/02
See application file for complete search history.

(56) References Cited

U.S. PATENT DOCUMENTS 1,793,494 A    2/1931  Lee
3,029,042 A    4/1962  Martin
(Continued)

FOREIGN PATENT DOCUMENTS

CH          295572 A      12/1953
DE          10346189 B3    5/2005
(Continued)

OTHER PUBLICATIONS

"Ancient Device in Super-Modern Form Applied with Success to Supermarine Type 322," FLIGHT: Variable Incidence, Apr. 25, 1946, pp. 409-412.
(Continued)

*Primary Examiner* — Timothy D Collins
*Assistant Examiner* — Jessica Wong
(74) *Attorney, Agent, or Firm* — Finnegan, Henderson, Farabow, Garrett & Dunner LLP

(57) ABSTRACT

Transformation method of hybrid transportation vehicle for ground and air includes the following transformation and reciprocal steps: Tilting the compensation cover (7) on. Expansion of both whole wings (1) from the transportation vehicle longitudinal position around two vertical axes (2) into the flying position. Expansion of rear parts of wings (1) from the top front parts of wings (1) into the spread flying position by tilting the rear of each wing (1) around a horizontal axis (3). The take-off and landing tilting of wings (1) by an angle of attack alpha=0 to 40° of the wings onset. Front wheels track (5) is reduced by axially shifting the front wheels (5) towards the fuselage. Furthermore, a corresponding hybrid transportation vehicle for ground and air is
(Continued)

US 9,815,345 B2

Page 2 described which contains reciprocal transformation mechanisms for transformation from a sterling double or four-track automobile into a sterling aircraft for take-off and landing on the ground or water, and vice versa.

10 Claims, 11 Drawing Sheets

(51) Int. Cl.
*B60F 5/00* (2006.01)
*B64C 3/54* (2006.01)
*B64C 3/38* (2006.01)

(56) References Cited

U.S. PATENT DOCUMENTS

| | | | |
|---|---|---|---|
| 3,056,564 A | 10/1962 | Zuck | |
| 4,375,898 A | 3/1983 | Stephens | |
| 4,579,297 A | 4/1986 | Ayoola | |
| 4,986,493 A | 1/1991 | Sarh | |
| 5,000,400 A | 3/1991 | Stuhr | |
| 5,050,817 A | 9/1991 | Miller | |
| 5,378,020 A | 1/1995 | Horn | |
| 6,086,014 A | 7/2000 | Bragg, Jr. | |
| 6,129,306 A | 10/2000 | Pham | |
| 6,131,848 A | 10/2000 | Crow | |
| 6,619,584 B1 | 9/2003 | Haynes | |
| 9,555,681 B2 * | 1/2017 | Klein | B64C 3/385 |
| 2003/0094536 A1 | 5/2003 | LaBiche | |
| 2003/0164424 A1 | 9/2003 | Smith et al. | |
| 2009/0127388 A1 | 5/2009 | Herzberger | |
| 2009/0302151 A1 | 12/2009 | Holmes | |
| 2010/0127130 A1 | 5/2010 | Eisentraut et al. | |
| 2010/0230532 A1 | 9/2010 | Dietrich et al. | |
| 2011/0042507 A1 | 2/2011 | Seifords, Sr. | |
| 2013/0068876 A1 | 3/2013 | Radu | |
| 2015/0102155 A1 | 4/2015 | Krastev | |

FOREIGN PATENT DOCUMENTS

| | | |
|---|---|---|
| GB | 372344 A | 4/1932 |
| GB | 556478 A | 10/1943 |
| UA | 29921 A | 11/2000 |
| UA | 33338 A | 2/2001 |
| WO | WO 01/23197 A1 | 4/2001 |
| WO | WO 2007/114877 A2 | 10/2007 |
| WO | WO 2011/014106 A1 | 2/2011 |

OTHER PUBLICATIONS

Buckholz, Jeffrey W., Summary of Roadable Aircraft, Carplane News, www.carplanenews.com, Jacksonville, Florida, USA.
Office Action issued in Chinese Patent Application No. 201280047973.X dated Sep. 6, 2015.
PCT International Search Report, issued in International Application No. PCT/SK2012/000010 dated Dec. 12, 2012.
Written Opinion of the International Searching Authority, issued in International Application No. PCT/SK2012/000010 dated Mar. 4, 2014.
Office Action issued in Japanese Patent Application No. 2016-159844 dated Jun. 12, 2017.

* cited by examiner

TRANSFORMATION METHOD OF HYBRID TRANSPORTATION VEHICLE FOR GROUND AND AIR, AND HYBRID TRANSPORTATION VEHICLE ITSELF

RELATED APPLICATIONS

This application is a continuation of U.S. application Ser. No. 14/241,239, filed Aug. 19, 2014, which is a National Stage Entry of International Application No. PCT/SK2012/000010, filed on Aug. 22, 2012, which claims priority from Slovakia Application No. PP 5039-2011, filed on Aug. 30, 2011 and Slovakia Application No. PUV 5044-2011, filed on Aug. 30, 2011. The contents of all these applications are hereby incorporated by reference in their entirety.

TECHNICAL FIELD

The invention concerns new category of a hybrid transportation vehicle for ground and air with possibility to take-off and land on the water, which is reciprocally transformable already during the travel on the ground. Transformation method of the hybrid transportation vehicle for ground into the sterling auto-mobile, and for air into the sterling aircraft is solved by an original way. The hybrid transportation vehicle construction, especially its transformation nods, is solved by an original way, too. The invention belongs to the area of automotive and aircraft industry.

BACKGROUND

At present standard transportation vehicles for ground (automobiles) and for air (aircrafts) exist. Their constructions are generally known. Also special transportation vehicles (hovercrafts) exist, but these belong neither among automobiles nor among aircrafts.

Another category of transportation vehicles exists that disposes with automobile as well as aircraft features. Californian company "Moller International" was developing VTOL (vertical take-off and landing) vehicle designed as automobile on three-wheel chassis. It is 5.9 m long, and its flight speed is calculated at 600 km/hr. It is equipped with four vertically tilting jet engines. Movement of this remarkable transportation vehicle is provided also on the ground by the four jet engines tilted horizontally. For this reason, it is rather handicapped automobile, as it has three wheels and its movement on the ground is not possible within common road traffic due to its jet engines effects. Fuel consumption as well as noise are very high.

Next representative of remarkable transportation vehicle is "Terrafugia Transition", described in published patent application WO 2007/114877, which is practically two-passenger aircraft 5.7 m long, 8.4 m wide and 2.1 m high, equipped with four-wheel chassis and collapsible wings that in approximately 20 seconds transform this vehicle into two meters wide automobile. The power of Rotax 912 motor with maximum output of 74 kW powered by unleaded gasoline is on the ground transferred on the front axle, or in the air spins the propeller embedded in the rear. With full tank "Terrafugia Transition" can fly the distance of 740 km, on the ground it can reach the speed approximately 120 km/hr, in the air app. 190 km/hr, for take-off and landing it needs app. 500 m track. Together with baggage its weight is app. 250 kg; 600 kg without crew. Disadvantage of this transportation vehicle is its method of transformation from aircraft into automobile. Each wing tilts around two horizontal axis into the shape of accordion, and stays tipped in vertical position. Automobile acquires a bizarre shape, and due to wings folded in vertical position, it is rather high. In case of crosswind automobile is instable in road traffic. Front axle has fixed wheel track width and during the flight front wheels are out, which causes great resistance for airflow.

In Slovakia, moreover, another "Aeromobile" hybrid transportation vehicle was developed for movement on the ground as well as in the air having a shape of sports car and being able to travel on roads using its own chassis. In its plan it also has car dimensions. In the rear it has two horizontal wing areas with propeller between them. Also in the front it has two wing areas. However it still gives impression of a futuristic aircraft. It is a non-transformable transportation vehicle. Its disadvantage is a fact that it includes in the rear situated two side vertical areas that stabilise top non-tiltable wing, which however decreases car stability in case of the crosswind.

Mentioned facts led to an effort to create a conception of such hybrid transportation vehicle for motion on the ground and in the air that would ensure quick reciprocal transformations from automobile into an aircraft. These reciprocal transformations would create a sterling automobile as well as a sterling aircraft.

The result of this effort is in the following described invention that solves transformation method of the hybrid transportation vehicle for ground and air as such.

BRIEF SUMMARY

Above mentioned inadequacies are eliminated by transformation method of the hybrid transportation vehicle for ground and air according to this invention, the principle of which consists in the fact that transformation of a sterling double or four-track automobile into a sterling aircraft for take-off from the ground includes sequence of transformation steps executable during idle/still-standing as well as running/driving of automobile. These are necessary transformation steps:

Tilting whole left and right front wing out from the transportation vehicle longitudinal position, each around its vertical axis using reciprocal transformation mechanism of tilting the wing in/out into/from flying position. Hybrid transportation vehicle in configuration of automobile has left and right front wing situated at left and right side of the automobile body, so that both retractable wings' axes are approximately parallel with longitudinal automobile axis. After this transformation step, axes of wings are stabilized in flying position, i.e. axes of spread wings are app. perpendicular to longitudinal automobile axis.

Tilting the rear of each wing (flaps) out from top front part of the wing using reciprocal transformation mechanism of the wing platform outline change into the spread standard flying position. This transformation step is executed, when wings axes are already stabilized in flying position, i.e. when axes of spread wings are app. perpendicular to longitudinal automobile axis. Before this transformation step each wing is still in non-spread status, i.e. rear of the wing—flaps are tilted over upwards to the front of the wing.

This is how the automobile is transformed into the aircraft and get ready for flying mode. After switching the drive unit (in case of common drive unit), the torque transferred to the front wheels is disengaged and redirected to the propeller situated in the rear of the body. In case of hybrid drive unit the torque transferred to the front wheels is disengaged from one drive unit, and from the other drive unit the torque is transferred to the propeller situated in the rear of the body.

This transformation of hybrid transportation vehicle transformed automobile into an operational aircraft.

Because of the aerodynamic drag decrease, after the aircraft take-off it is advantageous to provide next step of transformation, so that the aircraft becomes sterling. It is a transformation step of the front wheels track reduction, when wheels will be axially shifted towards the fuselage from left as well as right side. Wheels are equipped with cover—fender, aerodynamically embedded into the clean design line, creating quasi homogeneous front of the aircraft.

Another fundamental characteristic of the invention is a possibility of such transformation method of hybrid transportation vehicle during transformation from a sterling automobile into a sterling aircraft, where after the second transformation step of tilting rear of each wing (flats) out from the top front wing using reciprocal transformation mechanism of the wing platform outline change into the spread standard flying position, next transformation step, which will significantly shorten take-off track, will be included. It is a transformation step of take-off tilting of the wing by angle of attack alpha=0 to 40°. After aircraft take-off the alpha angle=0 to 40° of the wing onset will be adjusted to the original value.

Another fundamental characteristic of the invention is a possibility of transformation method of hybrid transportation vehicle during transformation from a sterling automobile into a sterling aircraft (amphibia) for take-off from water and landing at water. There is a condition for front wheels to be embedded into the float.

The principle of transformation method of hybrid transportation vehicle for ground and air according to this invention is also reciprocal transformation of sterling aircraft for landing on the ground into a sterling double or four-track automobile; this transformation method includes sequence of transformation steps executable only after the aircraft landing. Those are necessary transformation steps such as front wheels track expansion executed as early as in the air, retracting of the rear of each wing from spread flying position into the top front of the wing using reciprocal transformation mechanism of the wing platform outline change; retracting of the wing from flying position into the transportation vehicle longitudinal position around vertical axis using reciprocal transformation mechanism for retracting/extending of the wing.

Another fundamental characteristic of the invention is a possibility of such transformation method of hybrid transportation vehicle during transformation from a sterling aircraft into a sterling automobile, where after the first transformation step of front wheels expansion executed as early as in the air, next step, which will significantly shorten landing track, will be included. It is a transformation step of landing tilting of the wing by angle of attack alpha=0 to 40° of the wing onset. After aircraft landing the alpha angle=0 to 40° of the wing onset will be adjusted to the original value.

Into the transformation method of the hybrid transportation vehicle for ground and air it is also possible to include additional transformations the most essential of which consists in partial tilt of compensation cover on and off prior to extracting of wings into the flying position and prior to retracting of wings after reciprocal transformation into a sterling automobile. Among less essential additional transformation steps it is possible to include e.g. retraction and expansion of rear-view door mirrors into a clean design position.

Hybrid transportation vehicle for ground and air is based on above mentioned method according to the invention and necessarily consists of the body, cabin, retractable wings, chassis and driving unit with switching or coupling the transfer of torque on the propeller situated in the rear or on the front driven wheels and the principle of which consists in the fact that in the basic modification it contains reciprocal transformation mechanisms for transformation into a sterling double or four-track automobile or into a sterling aircraft for take-off and landing on the ground or water. Each first reciprocal transformation mechanism of retraction and expansion of right and left front wing is situated in the middle of the body and includes vertical axis of retraction and expansion of wing from the flying position to the position of hybrid transportation vehicle longitudinal axis and vice versa, and also contains the first actuator. The second reciprocal transformation mechanism of the each wing platform outline change around horizontal axis of the wing is situated in the wing body and contains the second actuator. The third reciprocal transformation mechanism of the front wheels track change is situated in the front of the body and contains the third actuator.

In extended modifications, the body of hybrid transportation vehicle for ground and air contains one to two fourth actuators for take-off and landing tilting of the wing by a angle of attack alpha=0 to 40°. Behind the cabin the body is equipped with pop-up compensation cover. Also the pop-up compensation cover is equipped with the fifth actuator. In specific realisations the first to fifth actuator is controlled electrically and/or pneumatically and/or hydraulically.

Hybrid transportation vehicle for ground and air in amphibian modification has front wheels shouldering adapted so that these are equipped with aerodynamic hollow float.

Advantages of transformation method of hybrid transportation vehicle for ground and air and hybrid transportation vehicle itself according to this invention consists in the fact that a sterling transformation from one transportation vehicle category into the other occurs, the result of which is a sterling automobile or a sterling aircraft. Transformation will take app. 20 to 30 seconds. This transformable hybrid transportation vehicle has a design of a sports automobile or a sports aircraft. However, it is 5 times lighter, as it only weighs 400 kg. It is made mainly of carbon. It takes-off at speed of app. 130 km/hr. It can reach a flight speed of app. 250 km/hr. Advantage of this transformable hybrid transportation vehicle is a simplicity of preparation for the flight itself, as the driver gets on the car in its garage and the formalities necessary for flight he/she can arrange while driving. After arrival at the airport or grass area the driver activates transformation of sterling automobile into the sterling aircraft. It will be executed without the necessity for driver to get out of his/her hybrid transportation vehicle.

DESCRIPTION OF THE DRAWINGS

The invention will be further explained on drawings, where at

Figure 2:
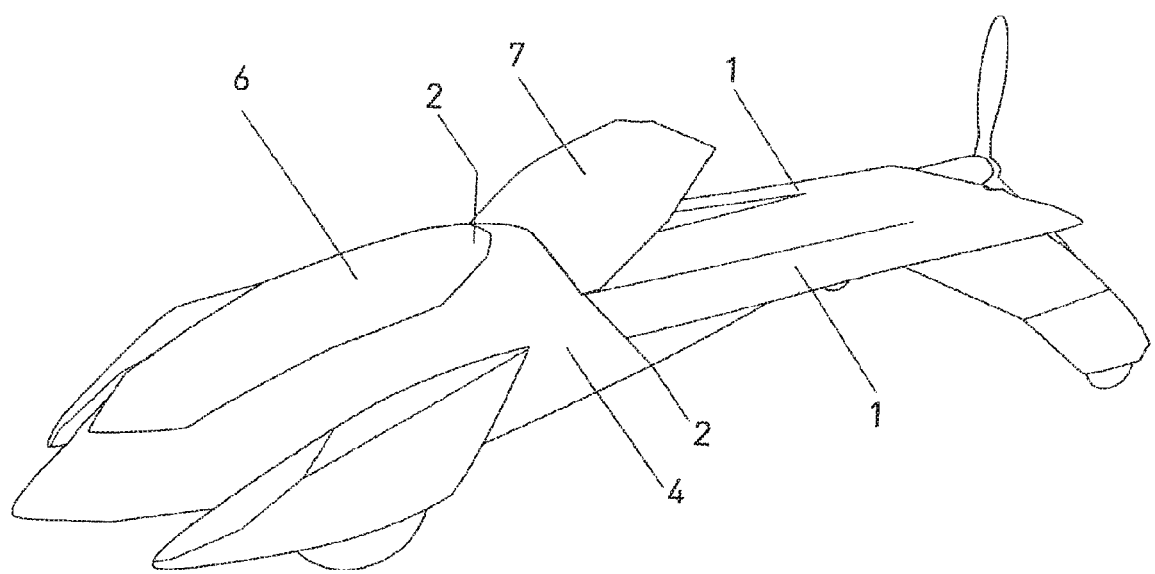

At FIG. 2 there is lifting the compensation cover off illustrated.

Figure 3:
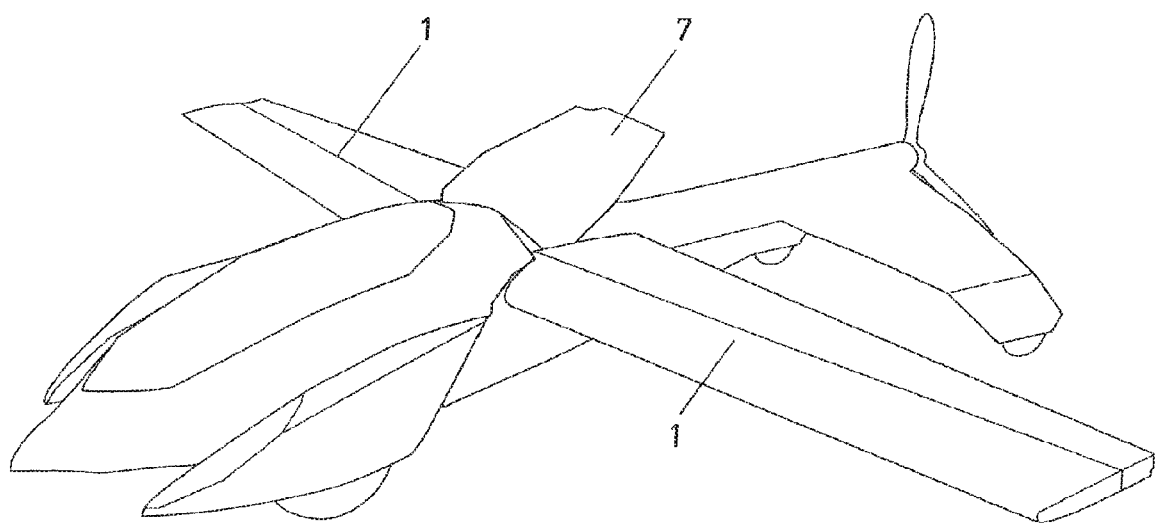

At FIG. 3 there is illustrated expanding of both wings from the hybrid transportation vehicle longitudinal position around vertical axes with rear parts of wings folded down.

Figure 4:
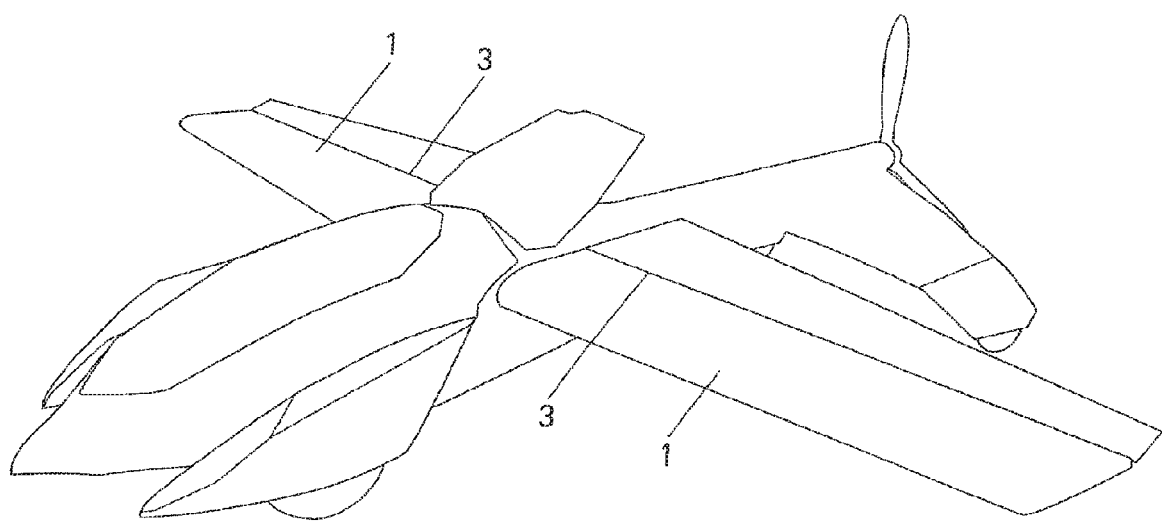

At FIG. 4 there is illustrated tilting of the rear parts of wings from the top front parts of wings.

Figure 5:
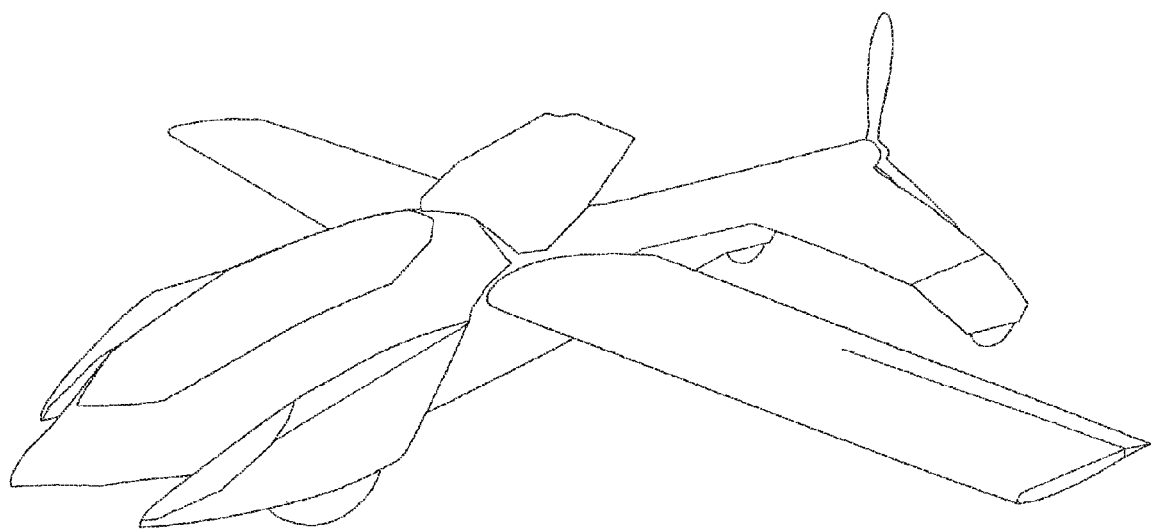

At FIG. 5 there is illustrated completed tilting of the rear parts of wings into the spread flying position.

Figure 6:
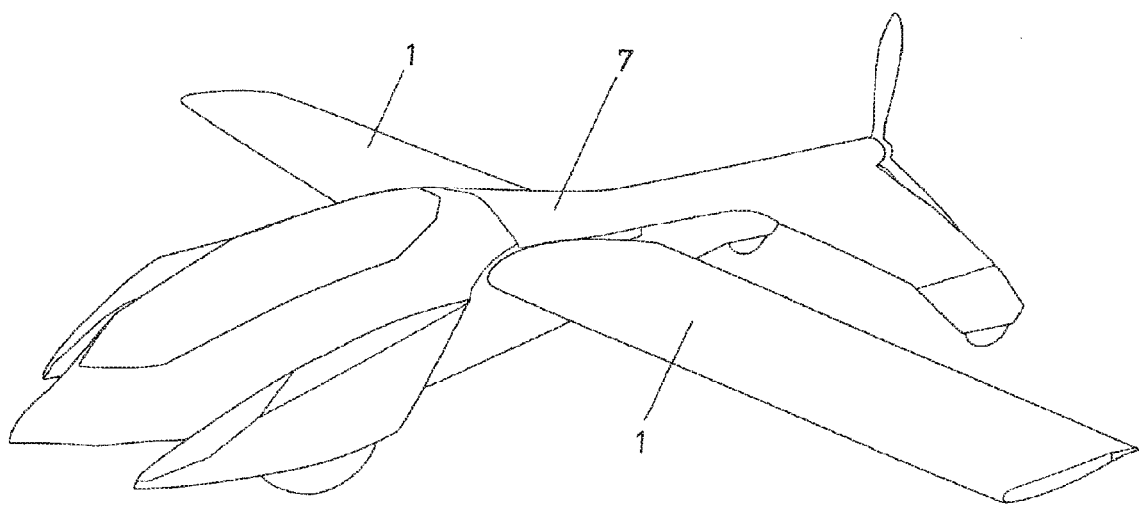

At FIG. 6 there is folding of the compensation cover down illustrated.

Figure 7:
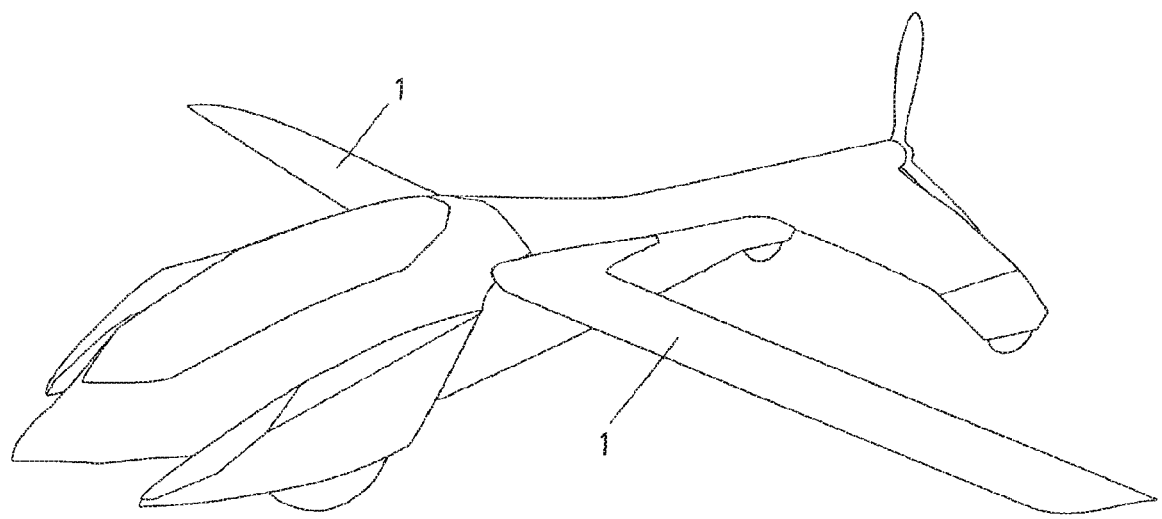

At FIG. 7 there is illustrated take-off tilting of the wing by wing angle of attack.

Figure 8:
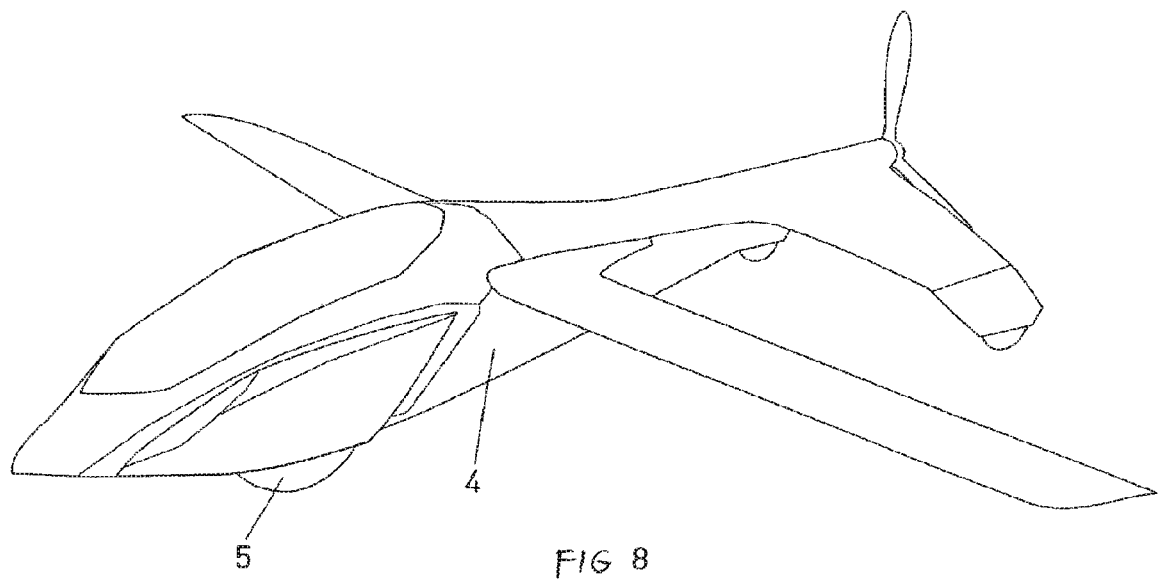

At FIG. 8 there is illustrated the front wheels track reduction.

Figure 9:
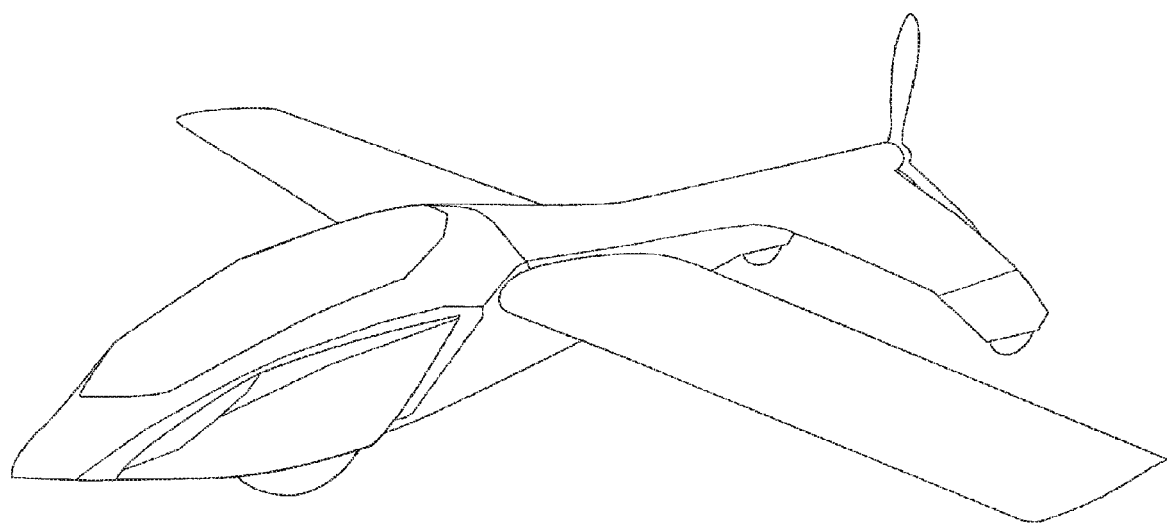

At FIG. 9 there is illustrated flying tilting of the wing without wing angle of attack, and creation of a hybrid transportation vehicle in modification of a sterling aircraft.

Figure 10:
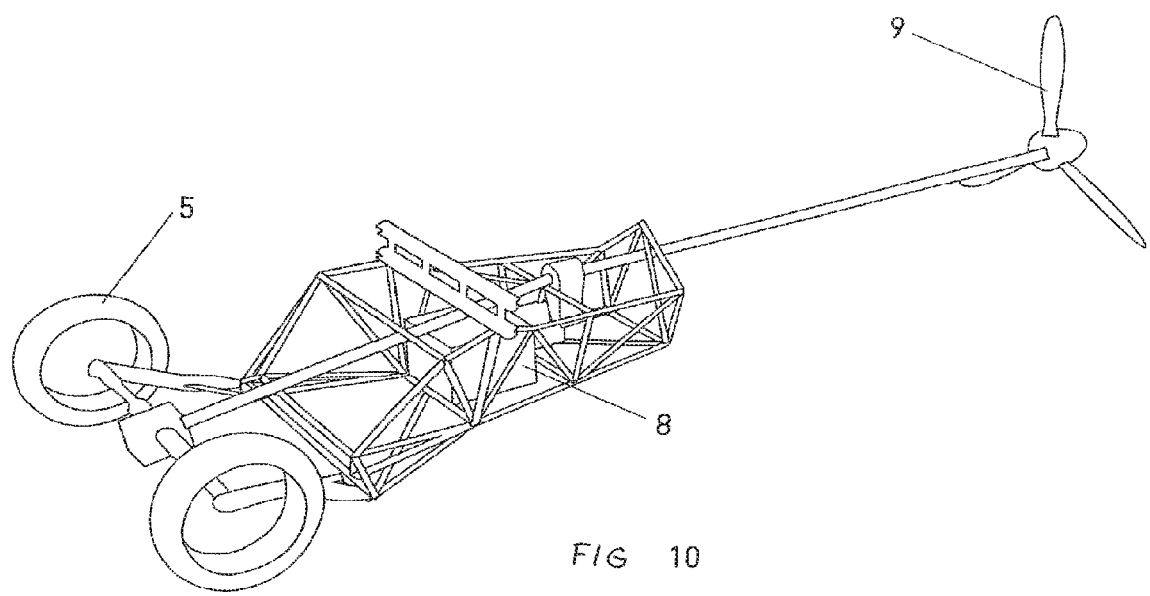

At FIG. 10 there is illustrated a rod supporting structure of a hybrid transportation vehicle with common driving unit for propeller and wheels.

Figure 11:
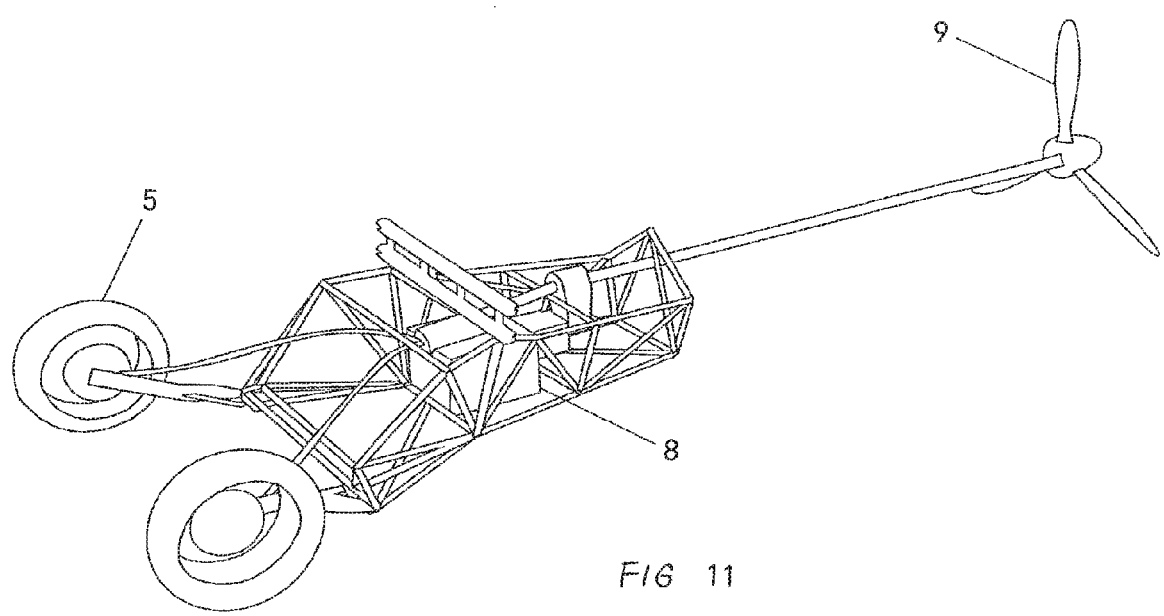

At FIG. 11 there is illustrated a rod supporting structure of a hybrid transportation vehicle with hybrid driving unit for propeller and wheels.

DETAILED DESCRIPTION

It is understood that various realizations of the invention are presented for illustration purposes, not as restrictions of technical solutions. Experts understanding the state of the art will find or will be able to find, using not more than routine experimentation, many equivalents of specific realisations of the invention. Such equivalents shall fall within the scope of the following patent claims.

For professionals understanding the state of the art it cannot be problem to submit optimal system, therefore these characteristics have not been solved in details.

Example 1

Figure 1:
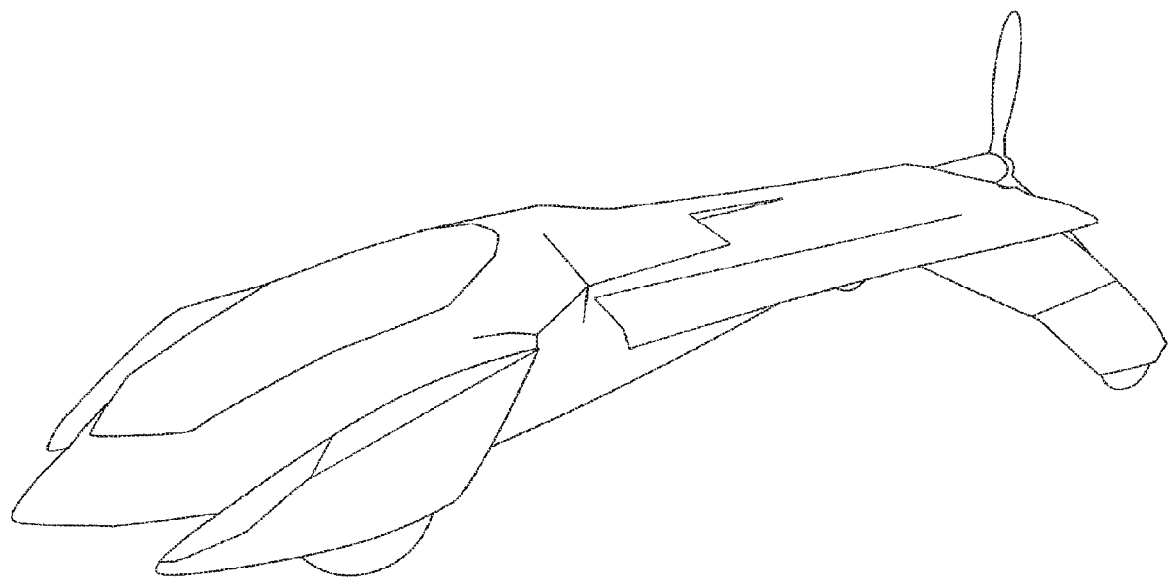
FIG. 1 there is a hybrid transportation vehicle in modification of a sterling automobile illustrated.

In this example of invention subject specific realization, a hybrid transportation vehicle in its simplest basic modification is described. Before transformation it has a characteristic of a sterling sports automobile, which is illustrated in FIG. 1. It consists of the body 4, cabin 6, retractable wings 1, chassis and common driving unit 8 with switching or coupling of torque transfer to the propeller 9 situated in the rear or to the driven front wheels 5, as illustrated at FIG. 10. In basic modification it contains reciprocal transformation mechanisms for transformation into a sterling double track automobile or into a sterling aircraft for take-off and landing on the ground. Two reciprocal transformation mechanisms of retraction—expanding for the right and left wing 1 are situated in the middle of the body 4 and each contains vertical axis 2 of the wing retraction—expanding 1 from flying position into the position of hybrid transportation vehicle longitudinal axis and vice versa. Two first reciprocal transformation mechanisms of retraction—expanding for the right and left wing 1 contain two first actuators with electric drive. The second reciprocal transformation mechanism of the each wing platform outline change 1 is situated in the wing body 1 and contains the actuator with electric drive, which provides tilting of the rear part of the wing 1 from the top part of the wing 1 into the spread flying position around horizontal axis 3 of the wing. The third reciprocal transformation mechanism of the front wheels track change 5 is situated in the front of the body 4 and contains the third actuator with electric drive and sliding semi axis. After transformation it has a characteristic of a sterling sports aircraft, which is illustrated in FIG. 9. The body 4 of a sterling sports aircraft has a clear aerodynamic shape with cabin cover 6, while from the centre part of the body 4 spread left and right wing 1 extend. Tapering rear part of the body 4 progresses into traversal short stabilizing tilted areas, at their ends equipped with rear wheels. From the rear of the body 4 the pusher propeller 9 extends horizontally. Driven wheels 5 are situated in the front of the body 4 and their track is at the minimum, so the wheels fenders 5 bear closely to the side front elements of the body 4. After reciprocal transformation it will again gain a characteristic of a sterling sports automobile, which is illustrated in FIG. 1. The body 4 of a sterling sports automobile has a clear aerodynamic shape with cabin cover 6, while from the centre part of the body 4 backward along its sides in longitudinal axis of a sterling sports automobile there are left and right wing 1 retracted. Driven wheels 5 are situated in the front of the body 4 and their track is now at the maximum, so the wheels fenders 5 withdraw from the side front elements of the body 4.

Example 2

In this example of invention subject specific realization, a hybrid transportation vehicle in its improved modification is also described. Again, prior to transformation it has a characteristic of a sterling sports automobile, the construction of which is sufficiently described in example 1. Moreover, in this extended modification, the body 4 of hybrid transportation vehicle for ground and air contains one to two fourth actuators with electric drive for take-off and landing tilting of the wings 1 by a angle of attack alpha=30°, as illustrated in FIGS. 7 and 8. After transformation it again has a characteristic of a sterling sports aircraft. This configuration significantly shortens take-off and landing track.

Example 3

In this example of invention subject specific realization, a hybrid transportation vehicle in its another improved modification is also described. Again, it has a characteristic of a sterling sports automobile, the construction of which is sufficiently described in example 1. Moreover, in this extended modification, the body 4 of hybrid transportation vehicle for ground and air is behind cabin 6 equipped with pop-up compensation cover 7. Tilting of the pop-up compensation cover 7 up and down is provided by the fifth actuator with electric drive, as illustrated in FIGS. 2 to 6.

Example 4

In this example of invention subject specific realization, a hybrid transportation vehicle in its another modification is also described. Again, prior to the transformation it has a characteristic of a sterling sports automobile, the construction of which is sufficiently described at least in one of examples 1 to 3. After the transformation it has a characteristic of a sterling sports amphibian. Construction is adapted so that front wheels shouldering 5 is equipped with aerodynamic hollow floats. This enables amphibian's take-off and landing on the water.

Example 5

In this example of invention subject specific realization, a hybrid transportation vehicle in its another modification is also described. Again, prior to the transformation it has a characteristic of a sterling sports automobile, the construction of which is sufficiently described at least in one of examples 1 to 4. After the transformation it has a characteristic of a sterling sports aircraft or amphibian. Construction is adapted so that actuators can be in variation with pneumatic or hydraulic drive. Another modification can consist in the variation that hybrid transportation vehicle will be four-tracked. Another modification can consist in the variation that hybrid transportation vehicle will be equipped with hybrid drive, as illustrated in FIG. 11. It means that for example front wheels 5 are driven by separate electric motors powered from battery or electric generator. The propeller 9 is driven by combustion engine via the coupling and transmission gearing.

Example 6

In this example of invention subject specific realization, a hybrid transportation vehicle in the most perfect modification is also described. Again, after the transformation from aircraft or amphibian it has a characteristic of a sterling sports automobile, the construction of which is in summary described at least in one of examples 1 to 5, and illustrated in FIGS. 1 to 11.

The description of functionality example of transformation method of a sterling double track automobile into a sterling aircraft for take-off from ground according to this invention follows, where in FIG. 1 a sterling automobile is illustrated. It is a sequence of transformation steps that are executed already during driving an automobile. It involves tilting the compensation cover on to make the space for full expansion of wings free, illustrated in FIG. 2. Tilting whole left and right front wing out from the transportation vehicle longitudinal position, each around its vertical axis using reciprocal transformation mechanism of tilting the wing in/out into/from flying position follows, illustrated in FIG. 3. Tilting the rear of each wing (flaps) out from top front part of the wing using reciprocal transformation mechanism of the wing platform outline change into the spread standard flying position follows, illustrated in FIGS. 4 and 5. Tilting the compensation cover back into its original position follows, illustrated in FIG. 6. Transfer of the torque into the propeller situated in the rear of the body follows. Take-off tilting of the wing by angle of attack alpha=0 to 40° to shorten take-off track follows, illustrated in FIG. 7. Because of the aerodynamic drag decrease, after the aircraft take-off it is advantageous to provide front wheels track reduction, when wheels will be axially shifted towards the fuselage from left as well as right side, which is illustrated in FIG. 8. After the aircraft take-off the alpha angle=0 to 40° of the wing onset will be adjusted to the original value, which is illustrated in FIG. 9. This transformation of hybrid transportation vehicle transformed a sterling automobile into a sterling operational aircraft.

The description of functionality example of reciprocal transformation method of a sterling aircraft for landing on the ground into a sterling double track automobile according to this invention follows, where in FIG. 9 a sterling aircraft is illustrated. It is a sequence of transformation steps that are executed already during the flight of the aircraft. It is the front wheels track expansion, when wheels will be axially shifted away from the fuselage from left as well as right side. The landing tilting of the wing by angle alpha=0 to 40° of the wing onset to shorten the landing track follows. Tilting the compensation cover on to make the space for retraction of wings free follows. After aircraft landing the alpha angle=0 to 40° of the wing onset will be adjusted to the original value. Tilting the rear of each wing (flaps) into the top front part of the wing using reciprocal transformation mechanism of the wing platform outline change follows. Tilting the whole left and right front wing in from flying position into the transportation vehicle longitudinal position, each around its vertical axis using reciprocal transformation mechanism of tilting the wing in/out follows. Tilting the compensation cover back into its original position follows. Transfer of the torque to the front driven wheels follows. This reciprocal transformation of hybrid transportation vehicle transformed a sterling aircraft into a sterling operational automobile.

INDUSTRIAL APPLICABILITY

Transformation method of hybrid transportation vehicle for ground, water and air, and hybrid transportation vehicle according to the invention finds its applicability in the aircraft and automotive industry.

What is claimed is:

1. A hybrid transportation vehicle for ground and air comprising:
    a body, a cabin, a set of retractable wings, a chassis, a driving unit that switches a torque transfer between a propeller situated at the rear of the vehicle and a pair of driven wheels, and a plurality of reciprocal transformation mechanisms for transformation of the vehicle into an automobile or into an aircraft for take-off and landing on the ground or water;
    wherein two first reciprocal transformation mechanisms for retraction and expansion of the wings from or to a flying position are situated in the middle of the body;
    wherein each first reciprocal transformation mechanism contains an actuator and a vertical axis for retraction and expansion of the wing by rotating around the vertical axis between the flying position in which an axis of the wing is approximately perpendicular to a longitudinal axis of the vehicle, and a retracted position in which the wing axis is approximately parallel to the longitudinal axis of the vehicle; and
    wherein two second reciprocal transformation mechanisms for changing the platform outline of the wings, each being situated separately in a wing body of each wing and each containing a horizontal axis of the wing and an actuator, for tilting a rear part of each wing onto a corresponding top front part of each wing.

2. The vehicle according to claim 1, wherein the body contains an actuator for tilting of the set of wings by an angle of attack alpha=0 to 40° for take-off and landing.

3. The vehicle according to claim 1, wherein the body is equipped with a pop-up compensation cover behind the cabin.

4. The vehicle according to claim 3, wherein the pop-up compensation cover is equipped with an actuator.

5. The vehicle according to claim 1, wherein the actuators are at least one of electric, pneumatic, and hydraulic.

6. The vehicle according to claim 1, where the wheels are equipped with aerodynamic fenders or hollow floats.

7. A method of transforming a hybrid vehicle, wherein the hybrid vehicle comprises a body, a cabin, a set of retractable wings, a chassis, a driving unit that switches a torque transfer between a propeller situated at the rear of the vehicle and a pair of driven wheels, and a plurality of reciprocal transformation mechanisms for transformation of the vehicle into an automobile or into an aircraft for take-off and landing on the ground or water, the method comprising:
    transformation of the automobile into the aircraft for take-off and landing on the ground or water, which includes:
        expansion of the wings from a retracted position in which a wing axis is approximately parallel to a longitudinal axis of the vehicle to a flying position in which the wing axis is approximately perpendicular to the longitudinal axis of the vehicle around a pair of vertical axes using a pair of first reciprocal transformation mechanisms; and expansion of rear parts of the wings using a pair of second reciprocal transformation mechanisms from a top front parts of the wings into the spread flying position; and reciprocal transformation of the aircraft into the automobile includes:

retraction of the rear parts of the wings from the spread flying position onto the top front parts of wings using the pair of second reciprocal transformation mechanisms; and retraction of the wings from the flying position in which the wing axis is approximately perpendicular to the longitudinal axis of the vehicle into the retracted position in which the wing axis is approximately parallel to the longitudinal axis of the vehicle around the pair of vertical axes using the pair of first reciprocal transformation mechanisms.

8. The method according to claim 7, wherein the body is equipped with a pop-up compensation cover behind the cabin, wherein that prior to expansion of the wings and expansion of the rear parts of the wings, tilting the compensation cover up is executed.

9. The method according to claim 7, wherein the body is equipped with a pop-up compensation cover behind the cabin, wherein that prior to retraction of the rear parts of the wings and retraction of the wings, tilting the compensation cover up is executed.

10. The method according to claim 7, wherein after the expansion of the wings and expansion of the rear parts of the wings, the wings are tilted by an angle of attack alpha=0 to 40° for take-off and landing.

* * * * *